United States Patent
Hagstrom

[11] Patent Number: 6,148,722
[45] Date of Patent: Nov. 21, 2000

[54] COMPACT DISC AND RECORDABLE COMPACT DISC THERMAL TRANSFER PRINTER

[75] Inventor: Erick Hagstrom, Hamel, Minn.

[73] Assignee: Primera Technology, Inc., Plymouth, Minn.

[21] Appl. No.: 09/326,041

[22] Filed: Jun. 4, 1999

Related U.S. Application Data

[60] Provisional application No. 60/088,397, Jun. 8, 1998.

[51] Int. Cl.[7] .................................................. B41F 17/00
[52] U.S. Cl. .............................. 101/35; 101/44; 400/208; 400/682
[58] Field of Search ................................ 101/44, 36, 37, 101/35, 4; 400/208, 58, 682

[56] References Cited

U.S. PATENT DOCUMENTS

| | | | |
|---|---|---|---|
| 4,577,200 | 3/1986 | Rix et al. | 346/140 |
| 4,943,814 | 7/1990 | Otto | 400/58 |
| 5,020,926 | 6/1991 | Wilhelm | 400/682 |
| 5,078,518 | 1/1992 | Ono et al. | 400/103 |
| 5,117,241 | 5/1992 | Stephenson | 346/1.1 |
| 5,248,207 | 9/1993 | Yamamoto et al. | 400/208 |
| 5,316,395 | 5/1994 | Imai | 400/56 |
| 5,317,337 | 5/1994 | Ewaldt | 346/1.1 |
| 5,319,392 | 6/1994 | Durst et al. | 346/76 PH |
| 5,326,179 | 7/1994 | Fukai et al. | 400/120 |
| 5,355,357 | 10/1994 | Yamamori et al. | 400/682 |
| 5,369,422 | 11/1994 | Yoshida et al. | 347/215 |
| 5,374,944 | 12/1994 | Janosky et al. | 346/76 PH |
| 5,427,029 | 6/1995 | Dumke | 101/484 |
| 5,450,102 | 9/1995 | Ishida et al. | 346/136 |
| 5,488,223 | 1/1996 | Austin et al. | 347/193 |
| 5,504,688 | 4/1996 | Letourneau | 101/4 |
| 5,518,325 | 5/1996 | Kahle | 400/70 |
| 5,519,427 | 5/1996 | Cavarero et al. | 347/214 |
| 5,542,768 | 8/1996 | Rother et al. | 400/120.16 |
| 5,612,727 | 3/1997 | Morimoto et al. | 347/198 |
| 5,709,488 | 1/1998 | Imai et al. | 400/208 |
| 5,771,797 | 6/1998 | Dubuit | 101/37 |
| 5,806,420 | 9/1998 | Erhard et al. | 101/37 |
| 5,815,191 | 9/1998 | Michielsen et al. | 347/188 |
| 6,000,329 | 12/1999 | Averill | 101/35 |
| 6,017,159 | 1/2000 | Tse | 400/208 |
| 6,019,526 | 2/2000 | Herbert | 400/58 |

FOREIGN PATENT DOCUMENTS

| | | |
|---|---|---|
| 0 297 668 A2 | 1/1989 | European Pat. Off. . |
| 0 422 927 | 4/1991 | European Pat. Off. . |
| 0 430 565 A2 | 6/1991 | European Pat. Off. . |
| 0 799 710 A1 | 10/1997 | European Pat. Off. . |
| 2 715 102 | 1/1994 | France . |
| 197 50 570 A1 | 5/1998 | Germany . |
| 55-164180 | 12/1980 | Japan . |
| 62-080075 | 4/1987 | Japan . |
| 10 157 176 | 6/1998 | Japan . |
| 2 320 912 | 7/1998 | United Kingdom . |

*Primary Examiner*—Eugene Eickholt
*Attorney, Agent, or Firm*—Westman, Champlin & Kelly, P.A.

[57] ABSTRACT

A thermal printer for printing onto circular objects includes a housing that mounts a platen and a carrier for the circular object, and a separate removable and latchable carriage carrying the printhead and positionable on the housing to retain the printhead in a fixed location. The carrier for the circular object is driven relative to the printhead while printing takes place. The platen, carrier and circular object are urged against the printhead as the carrier moves. An actuator is used for moving the platen and carrier with a variable force to vary the force of the circular object against the printhead so that the force is increased when the length of the line of printing increases to span the circular object.

26 Claims, 12 Drawing Sheets

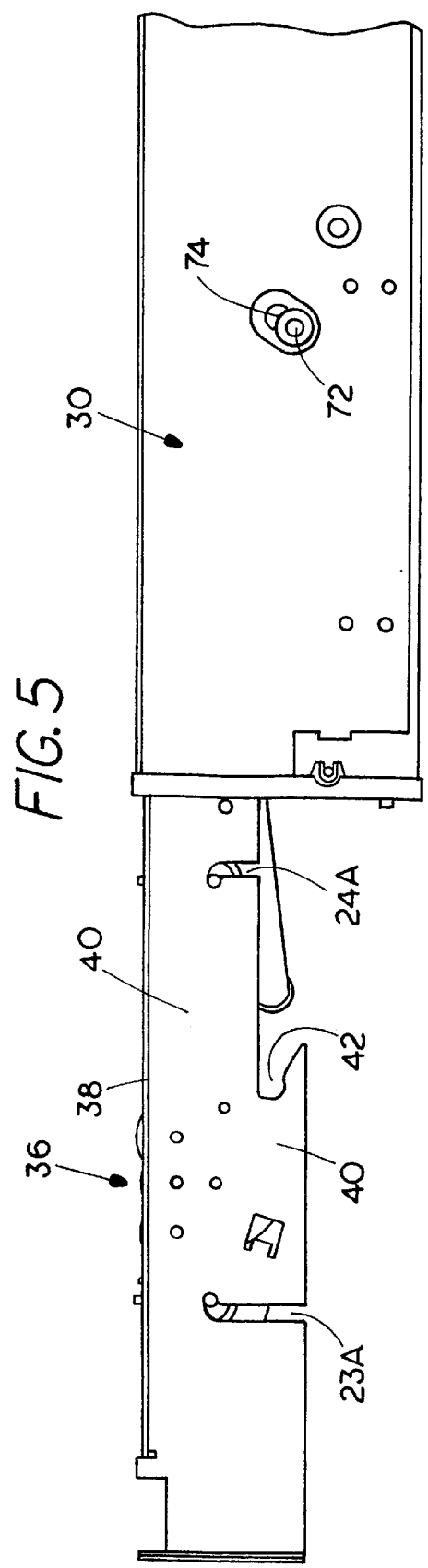

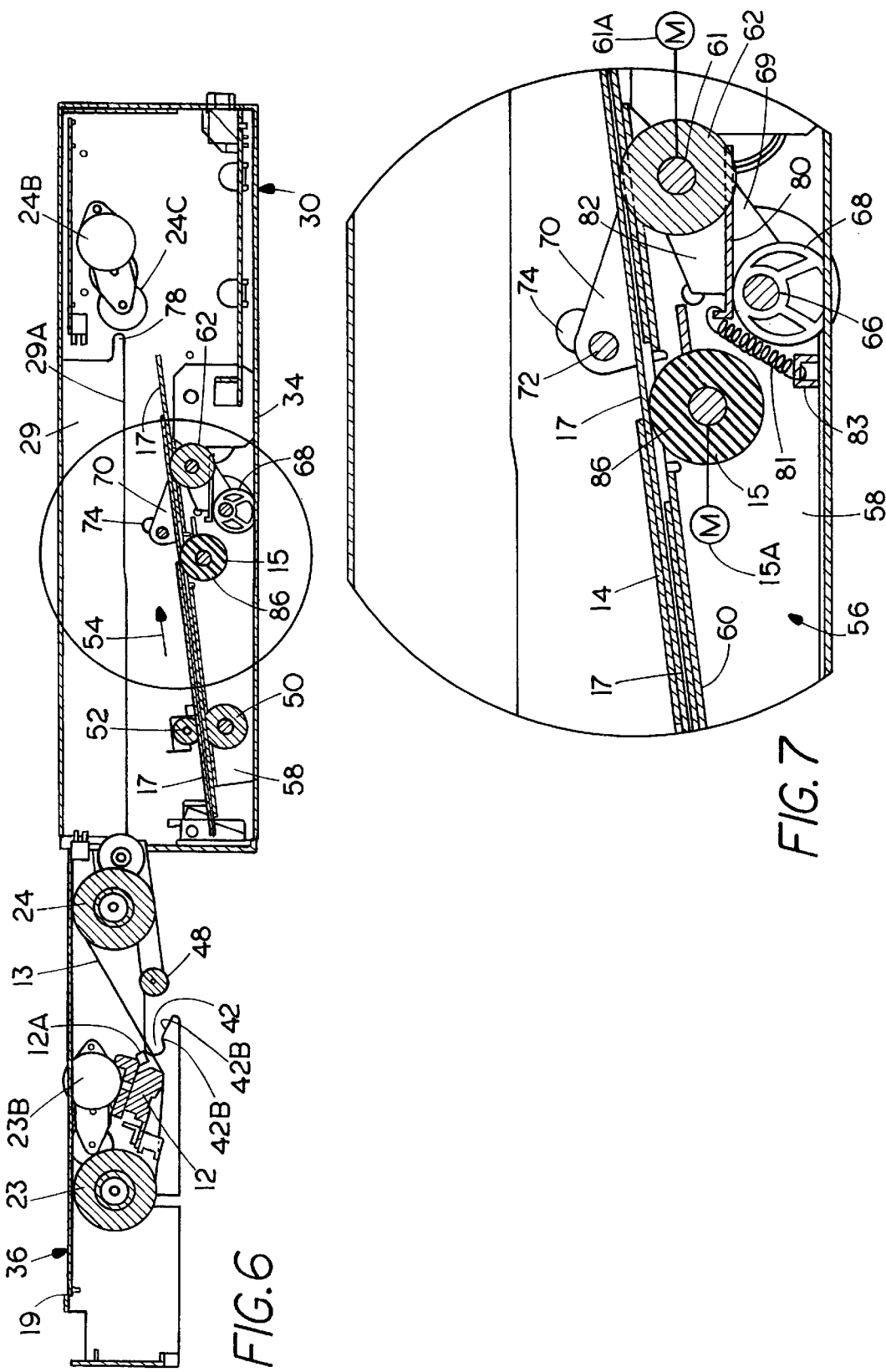

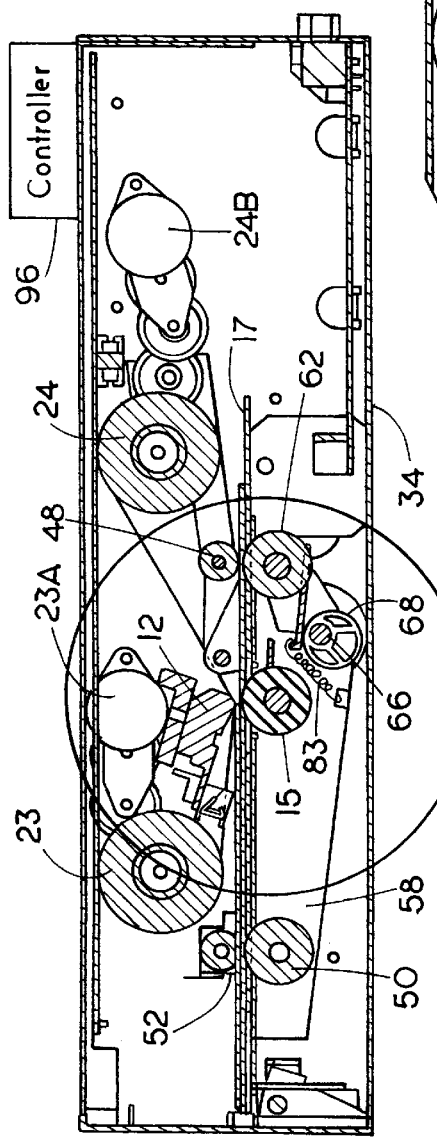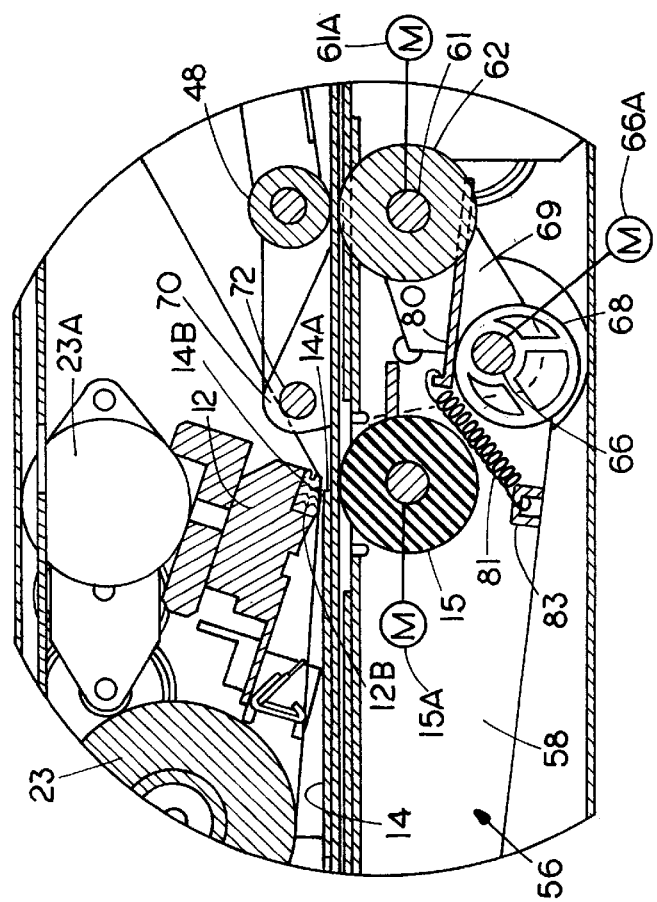

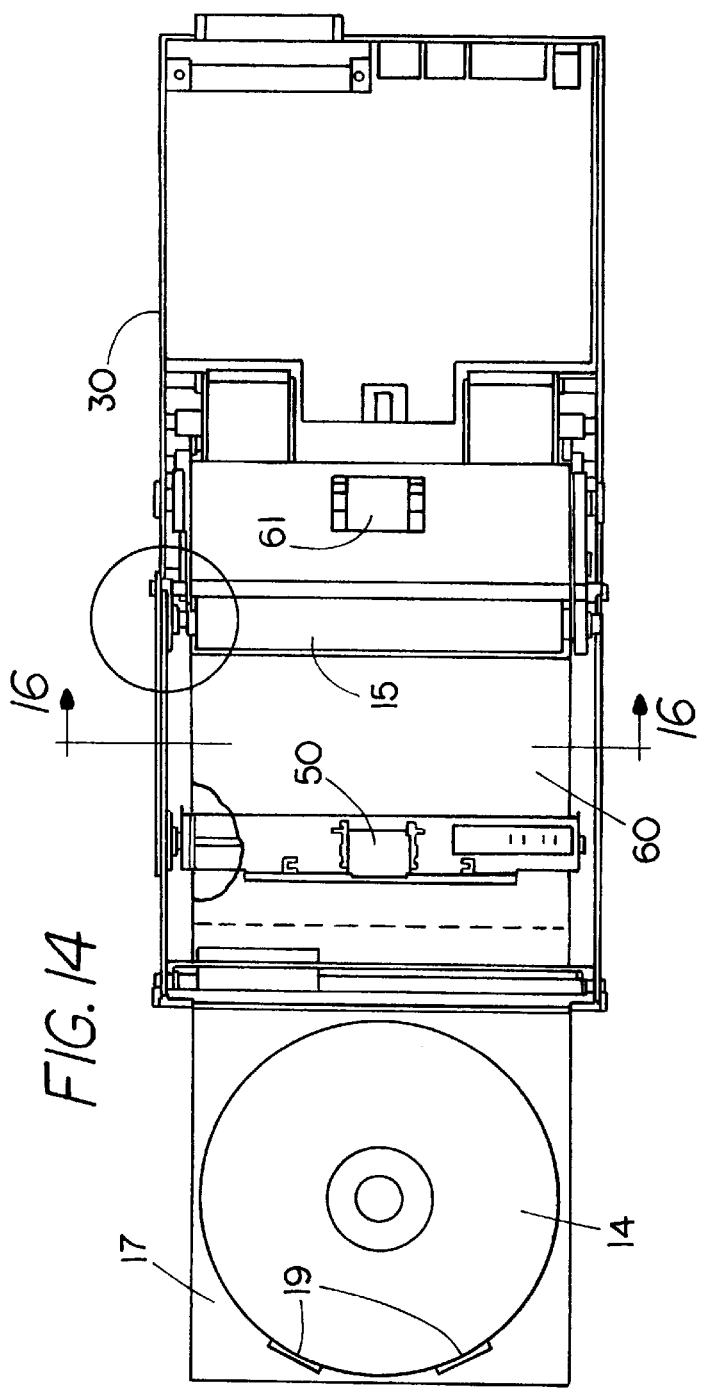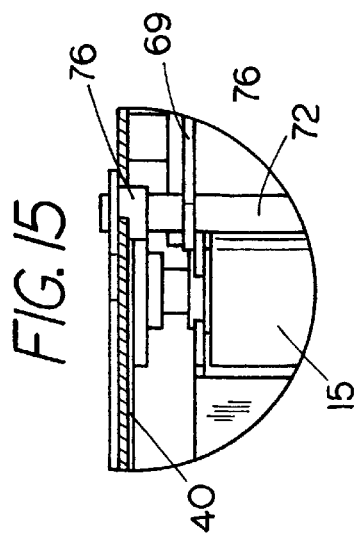

COMPACT DISC AND RECORDABLE COMPACT DISC THERMAL TRANSFER PRINTER

CROSS REFERENCE TO RELATED APPLICATION

The present invention claims priority to Provisional Application Serial No. 60/088,397, filed Jun. 8, 1998, and entitled COMPACT DISC (CD) AND RECORDABLE COMPACT DISC (CD-R) THERMAL TRANSFER PRINTER.

BACKGROUND OF THE INVENTION

The present invention relates to a thermal transfer printer that will transfer an imaging compound, such as a wax, wax resin or wax resin composite, or a dye from a carrier ribbon, film or web to a substrate, as shown, a compact disc, using linear printing across transverse (chordal) lines on the circular disc, which vary in length as the disc progresses underneath the thermal printer head. A platen roller is mounted so that it pushes the disc carrier and disc against the printhead at a desired force for adequate printing for different line lengths.

Thermal printing technology for compact discs (CDs) and recordable compact discs (CD-Rs) incorporate pivotally mounted heads and linear platens with resilient surfaces and expensive clamping mechanisms for the CD. Loading thermal ink ribbons is cumbersome, inconvenient and time-consuming because the ribbon must be threaded through the rollers and the printhead and manually re-attached to a take-up core.

Current technology for printing onto CDs utilizes expensive head actuating and force modifying mechanisms. The printhead is moved on pivotally mounted arms that extend substantially beyond the envelope of the printhead, with a linearly driven carriage that has to hold the disc over an expensive, flat resilient surface with a clamping device that moves with the carriage. Threading the ribbon through the printhead and mounting ports of the presently available printers is a tedious job which includes taping the ribbon to the carriage, then taping the ribbon after the carriage is driven into the printer. This leads to large, high-cost thermal transfer CD, CD-R and digital video disc (DVD) printers. It is desirable to substantially reduce the size in order to take less space for the CD printers, as well as manufacturing costs and user interaction.

SUMMARY OF THE INVENTION

The present invention relates to a thermal transfer printer utilizing a printhead cartridge that mounts into a frame and prints on CDs and CD-Rs reliably. A minimum of time is required for inserting ribbons into the printhead cartridges. The printhead is mounted so that when it is in place on the printer frame, it does not move relative to the membrane or support carriage for the CD or CD-R. A platen roller is mounted so that it and a carrier for the disc can be moved against the printhead under a spring force that is controlled externally. The platen roller, in one form of the invention, can be slidably mounted, and can be urged toward the printhead with springs that can be varied in force. In another form of the invention, the platen, carrier and substrate can be mounted on a pivoting frame and urged up against the printhead where the force is reacted by the printhead for contact printing.

In one form shown, a schematic representation is made for a spring loading of the platen, and also in a more detailed form, the platen is mounted onto a pivoting frame having side arms that are supported on a pivot. The frame mounts not only the platen, but also drive rollers for the substrate carrier. The force with which the platen, carrier and substrate are urged against the printhead during the printing operation is controlled by a cam that acts on a cam follower connected to the platen frame by springs so that the frame pivots toward the printhead under spring load. The platen is resilient to provide some cushioning load of the cartridge and the substrate, (CD or CD-R for example) against the printhead which is held in a fixed position.

The printhead cartridge contains the printhead, as well as the ribbon, film or web supply and take-up rollers, and it permits easy loading of the ribbon so that the ribbon does not have to be threaded through pairs of rollers or openings, and does not require special "lead-in" tapes or the like. Also, the printer provides easy front loading so it fits within a PC box or other container.

Providing the loading that varies the force on the printhead, precise control can be obtained using motors or drives that are synchronized to the position of the circular disc substrate under the printhead. Increased force can be applied when a longer line of printing is required because of the increasing transverse distance as one gets close to the full diameter of the disc.

BRIEF DESCRIPTION OF THE DRAWINGS

FIG. 5 is a side elevational view of the form of the invention shown in FIG. 4;

FIG. 6 is a horizontal sectional view of the device shown in FIG. 5 taken generally along line 6—6 in FIG. 4;

FIG. 6A is a side view similar to FIG. 6 with the cartridge carrying the printhead and ribbons partially installed and about to be latched;

FIG. 6B is a view similar to FIG. 6A with the printhead fully in place and the cartridge carrying a substrate to be printed on the exterior of the main cabinet;

FIG. 7 is an enlarged sectional view of a portion circled in FIG. 6;

FIG. 8 is a sectional view similar to that shown in FIG. 6 with the printhead and cartridge in working position, and printing about to start on a circular substrate or disc;

FIG. 9 is an enlarged fragmentary view of a portion of the assembly shown circled in FIG. 8;

FIG. 14 is a top plan view of the printer with the platen frame in position in cross section, with the printhead cartridge removed for sake of clarity;

FIG. 15 is an enlarged sectional view of a portion circled in FIG. 14;

DETAILED DESCRIPTION OF THE PREFERRED EMBODIMENTS

Figure 1:
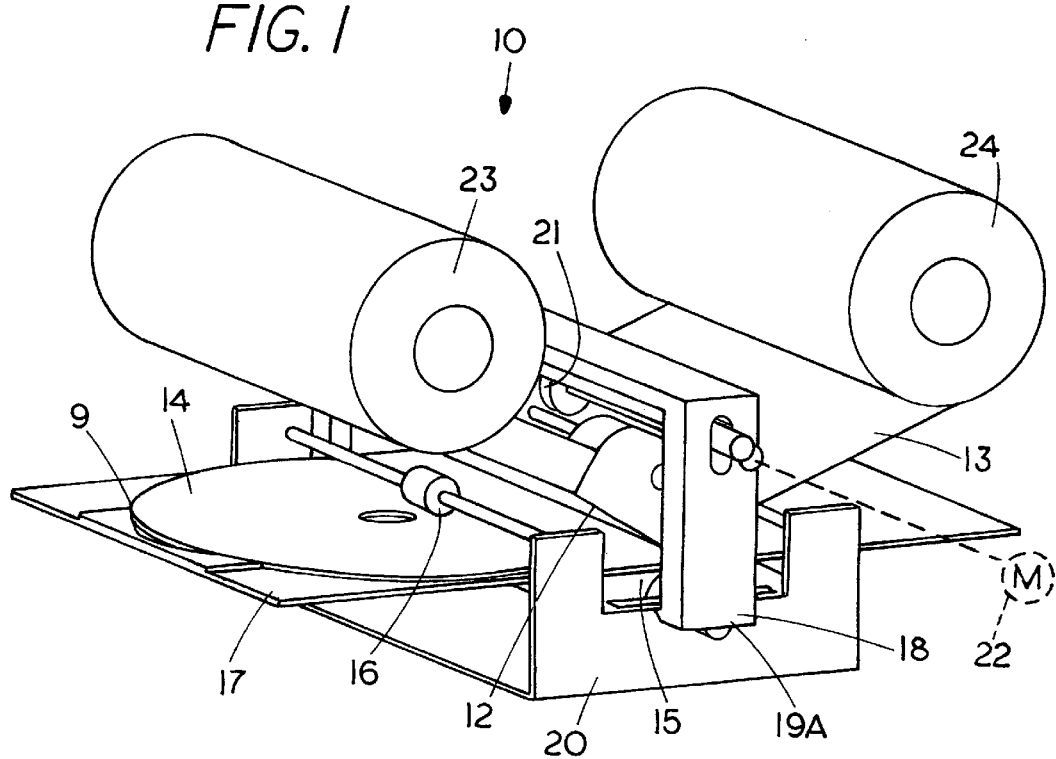
FIG. 1 is a schematic representation of one form of the present invention.
Figure 2:
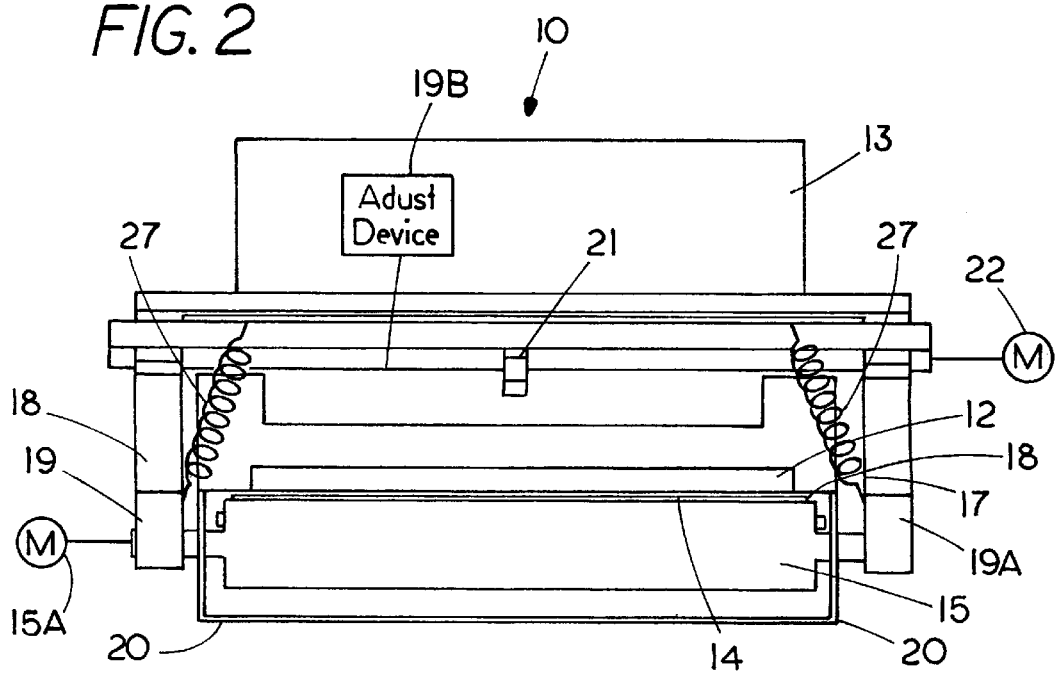
FIG. 2 is a front view of the form of the invention shown in FIG. 1.
Figure 3:
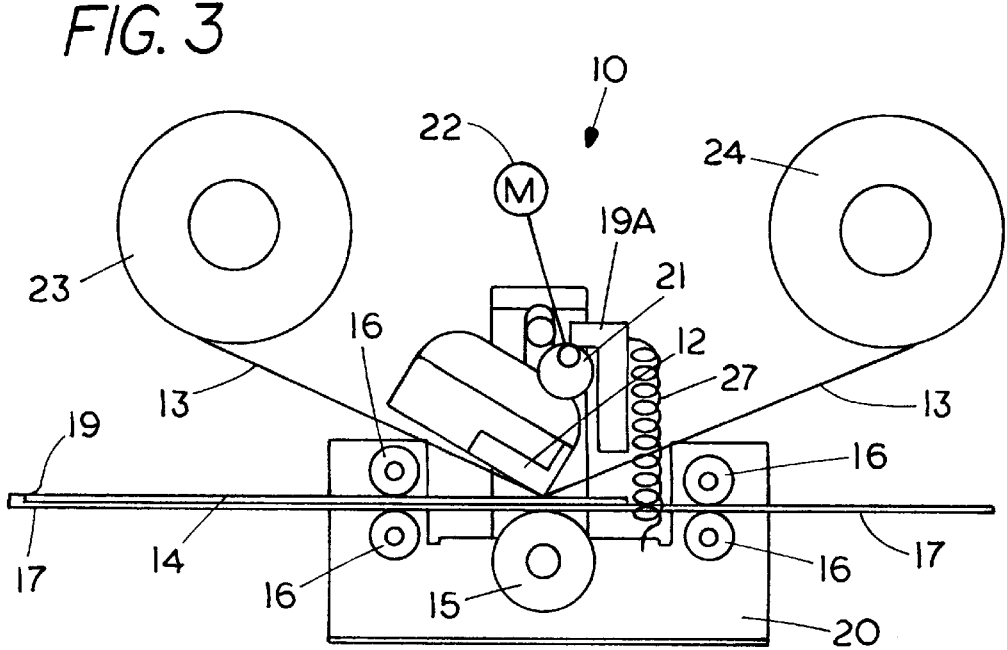
FIG. 3 is a schematic side-elevational view of the device of FIG. 1, again schematically illustrated.

FIGS. 1 through 3 show a schematic view of a printer 10 embodying the principles of the present invention and include a printhead 12 that has a series of very small heat elements (resistors) that transfer a base coating or an imaging compound, wax, resin or resin composites or sublimation dyes from a carrier ribbon, film or web 13, to a substrate 14, which is typically, but not always, a circular compact disc or recordable compact disc. The platen 15 is used to force the substrate 14 against the ribbon 13 and create intimate contact between the printhead, ribbon and substrate. The substrate is carried on a support or carrier 17, and the platen 15 will be controlled to push the carrier 17 up against the substrate and then in turn, push the substrate against the printhead 12 with the desired amount of force for printing images.

Images are created through control of the heat elements on the thermal transfer printer to selectively apply the imaging compound to specific areas of the substrate. Colors can optionally be created with multiple passes using a panelled ribbon, combined with dithering techniques to create several perceived colors, as is known.

The platen roller 15, which is drive by a stepper motor 15A, can be controlled in two ways. One is to control the speed of the driving of the carrier 17 and the disc 14, as it is held against the printhead 12 under a fixed spring load. The carrier is rigid enough so that it can support the weight of the CD when it is fully extended out from the printer, as will be shown in subsequent drawings, in a position linearly horizontal to the plane of the support as it is being printed, and yet will have some "give" as the platen roller 15 urges the carrier 17 and the disc 14 on the carrier against the printhead. The second way of control is to vary the force with which the platen roller engages the carrier 17 and thus the force with which the disc is urged against the printhead.

Brackets 18 are used for mounting the platen relative to the printhead as shown schematically, and the platen roller 15 can be moved out of the way, so that a frame that contains the printhead and ribbon can be removed from the printer easily.

Power supplies generally are those of a PC, and the printer can be driven from a personal computer.

An exemplary solution is to vary the force of the platen roller 15 against the fixed printhead 12, either by use of adjustable springs illustrated schematically at 27 in FIG. 2, or as will be explained in the exemplary form of the invention. The platen roller is mounted in such a way that it is held against the carrier or support 17 in a floating manner without a pivotally mounted frame such as providing slots for guiding the carrier. The roller is clamped to the printhead frame through intermediate brackets 18 and 19A which can be unclamped and allow the platen roller to drop away from the printhead. By unclamping and moving the platen roller out of the way, the ribbon can be installed in a straightforward fashion.

The clamping brackets 18 and 19A can be actuated fairly easily through a cam system mounted just above the printhead. This system saves space and allows for electronic control of the head force. The disc and membrane or carrier are held by pinch rollers 16 which locate the disc in the membrane by forcing it up against a reference edge 19 of the carrier when being engaged and they serve to hold the disc in a controlled, known position throughout the printing process.

The chassis of the printer has a moveable portion 20 that allows the platen roller 15 to move vertically while maintaining the fixed horizontal position of the platen roller. The vertical movement is accomplished through a camshaft 21 mounted through the top portion of the chassis (which is fixed and nonmoveable). The camshaft 21 is drive by a stepper motor 22 and has two springs 27 which are attached to a shaft or bracket 19A which is driven by the camshaft on one end and pivotally attached to the moveable portion 20 of the chassis on the other so it tilts. by incrementally moving the camshaft 21 by actuating the stepper motor, 22, the roller 15 can be raised or lowered under spring force, thus creating the pressure upon the membrane or carrier 17. This allows the platen roller 15 to act as a pinch roller in the sense that as it is raised, it pinches the membrane or carrier and the CD between itself, the printhead and the ribbon. The pinching action allows the amount of pressure applied to the CD to vary as the CD passes under the printhead depending on the position of the camshaft.

The springs 27 act on the platen to move it up in a desired manner, toward the carrier 17 to act against the printhead 12.

The print ribbon 13 is mounted on a supply roller 23, and there is a take-up roller 24 which will be moved with the same cartridge as the printhead, so that the print supply and take-up rollers can be easily installed, without the need for threading the film or ribbon through particular rollers or slots.

Figure 4:
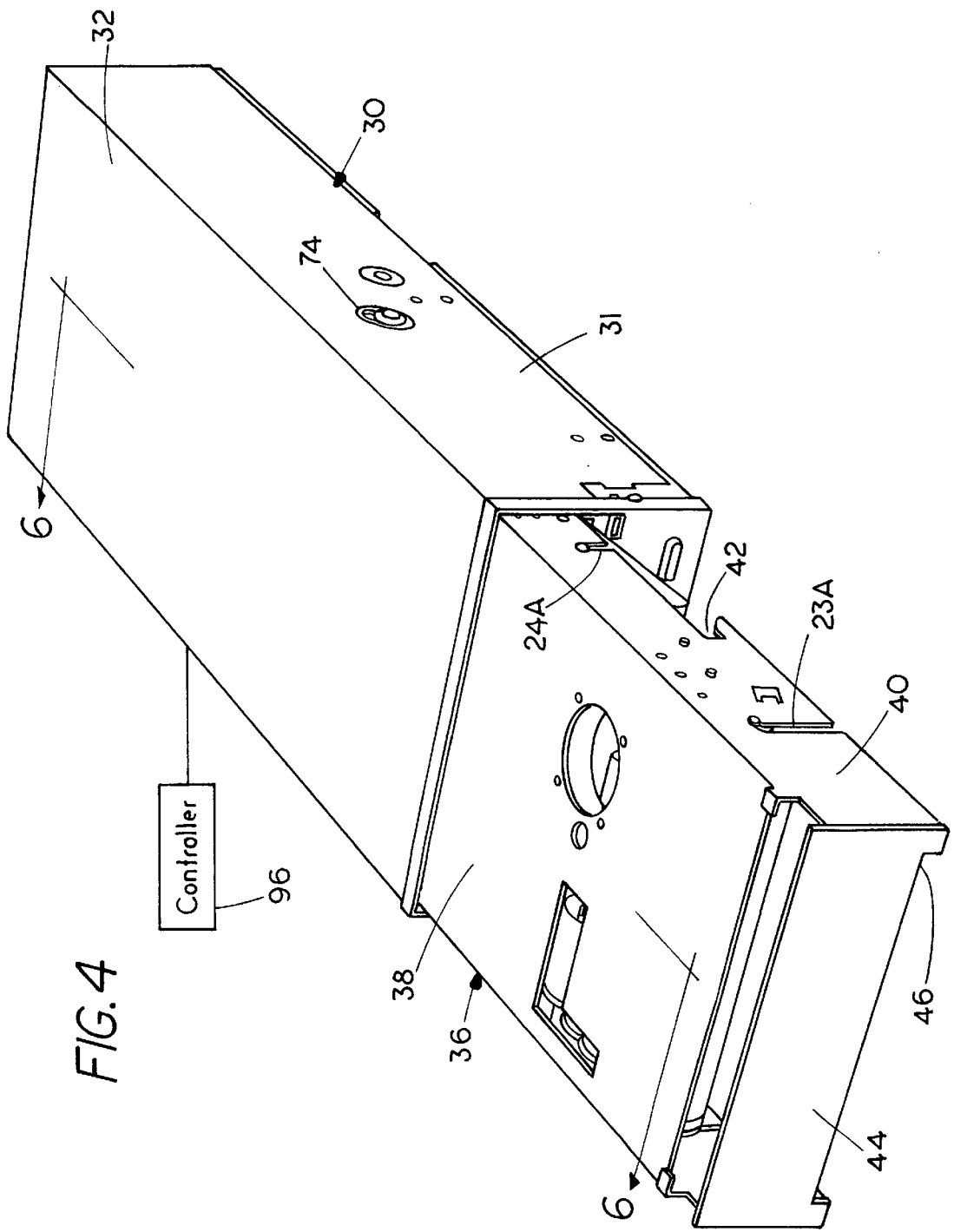
FIG. 4 is a perspective view of a housing or cabinet showing a printhead cartridge on which the printhead is located about to be inserted into the cabinet.

In FIGS. 4 through 16, the illustrative embodiment is illustrated. Referring first to FIG. 4, a main cabinet 30 forms a housing that has side walls 31, and a top wall 32 as well as a bottom wall 34, (see FIGS. 6, and other Figures for example). A printhead cartridge assembly 36 that is a unitary assembly has a top wall 38, and depending side walls 40. The side walls 40 are made to fit between the side walls 31 of the main housing, and it can be seen that the side walls 40 include a latch recess 42 on each side that will be used for holding the cartridge assembly 36 in position when it is fully inserted into the housing 30. Also, as can be seen in FIG. 6, a cutout portion 29 of a wall has a support edge 29A that will support the printhead cartridge 36 in proper position.

The printhead cartridge 36 has a front wall 44 that includes a recess 46 that will permit the CD support or carrier 17 and disc (CD, CD-R or DVD) 14 to be on the exterior of the housing for loading, and then driven into the housing 30 for printing.

In FIG. 6, it can be seen that the supply roll 23 for the ribbon film or web 13 and the take-up roll 24 for the ribbon, film web are mounted onto the side walls of the printhead cartridge. The slots 23A and 24A shown in FIGS. 4 and 5 mount shafts for these supply and take-up rollers and hold them in off-set notches. The thermal printhead 12 is mounted to the side walls 40 of the cartridge assembly 36, and is fixed in position. A suitable sensor 12A can be used for sensing the ribbon 13 for various controls. A motor 23B can be used for driving the supply roll 23. The take-up roller 24 will be driven from a motor 24B through a gear train 24C that will match up when the printhead cartridge assembly is in position into the housing 30.

A spring loaded pinch roller 48 is mounted on the printhead cartridge assembly 36, and will cooperate with drive rollers, as will be explained, for driving the carrier 17 and the disc 14 across the printhead for printing.

In FIG. 6, the housing 30 is also shown in cross section. The carrier 17 is mounted for movement on a drive roller 50 at an input end of the housing that cooperates with a spring loaded pinch roller 52 to engage the carrier 17 and drive it in direction as indicated by the arrow 54. A platen support frame 56 has a top plate 60 and a pair of side walls or arms 58, 58 to form an inverted channel. The carrier 17 moves over the top plate 60 which is supported on the arms 58 that are pivotally mounted on the axis of a shaft 61 of a drive roller 62. The arms and top plate 60 extend toward the input end of the housing 30.

The platen support top plate 60 joins the side arms or walls 58. The drive rollers and platen roller carry and drive the carrier 17 and disc 14 into printing position. The shaft 61 and roller 62 are suitably driven with stepper motor 61A, and will drive the carrier 17 as printing progresses. The drive roller 62 will cooperate with the pinch roller 48 on the printhead cartridge for providing a driving force when the printing has commenced, and the carrier 17 is being moved in direction indicated by arrow 54.

Figure 7A:
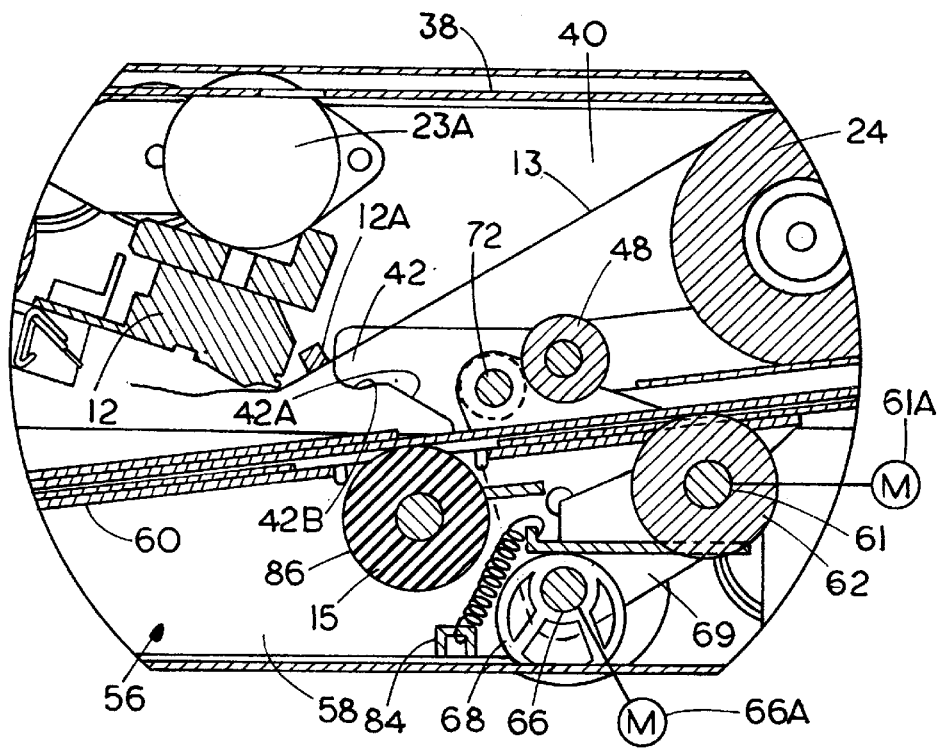
FIG. 7A is a sectional view similar to FIG. 7 with the portion enlarged circled in FIG. 6A.
Figure 7B:
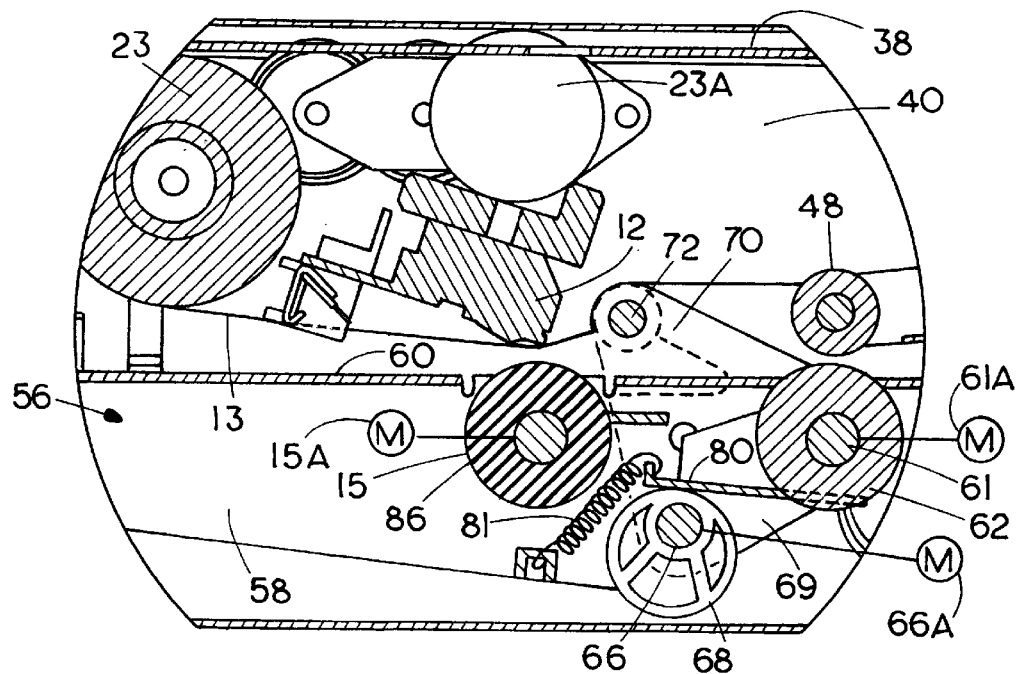
FIG. 7B is an enlarged view of the portion of the circle in FIG. 6B.
Figure 16:
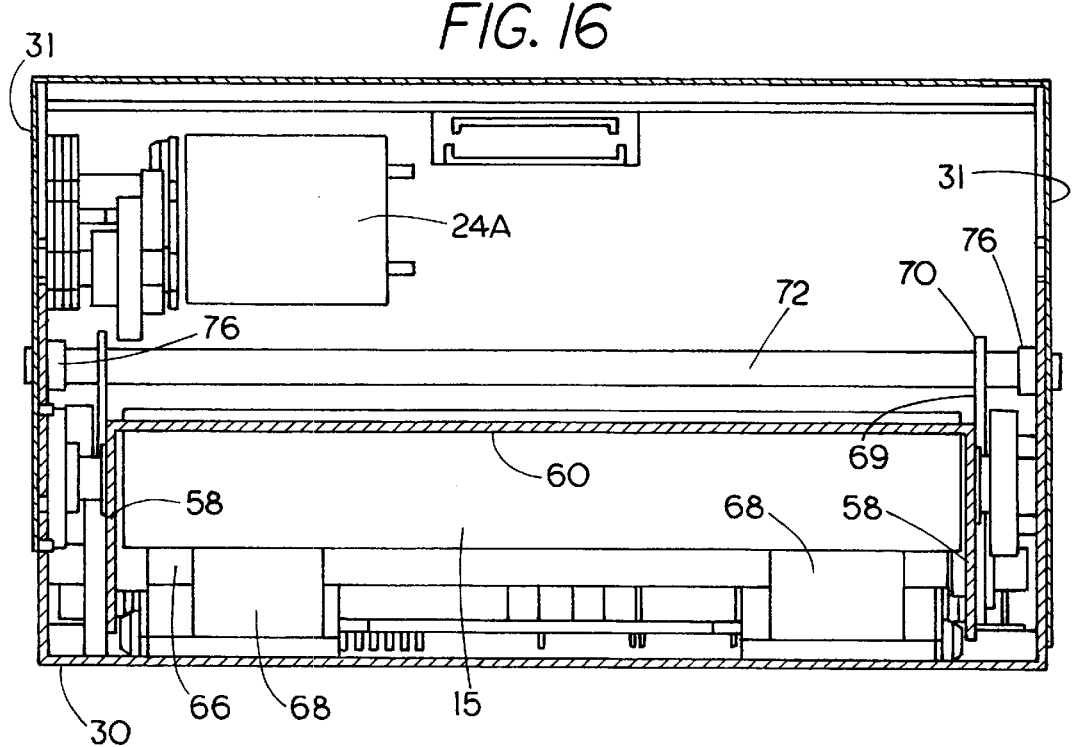
FIG. 16 is a sectional view taken generally along line 16—16 in FIG. 14.

As can be seen in FIG. 7, which is an enlarged cross section view, the side arms or walls 58 of the platen support frame are to the side of triangular plates 69 that are pivoted on shaft 61 adjacent the housing side walls as well. There is a plate 69 on each side of the platen support 56. Plates 69 rotatably mount a cross shaft 66 on which a pair of cam rollers 68 are mounted. The cam rollers 68 are also shown in FIG. 16. The cam shaft 66 is drive by stepper motor 66A under control from controller 96 and the platen roller stepper motor 15A is also controlled by controller 96 so the platen drive motor and camshaft drive motor can be controlled under common control.

Figure 17:
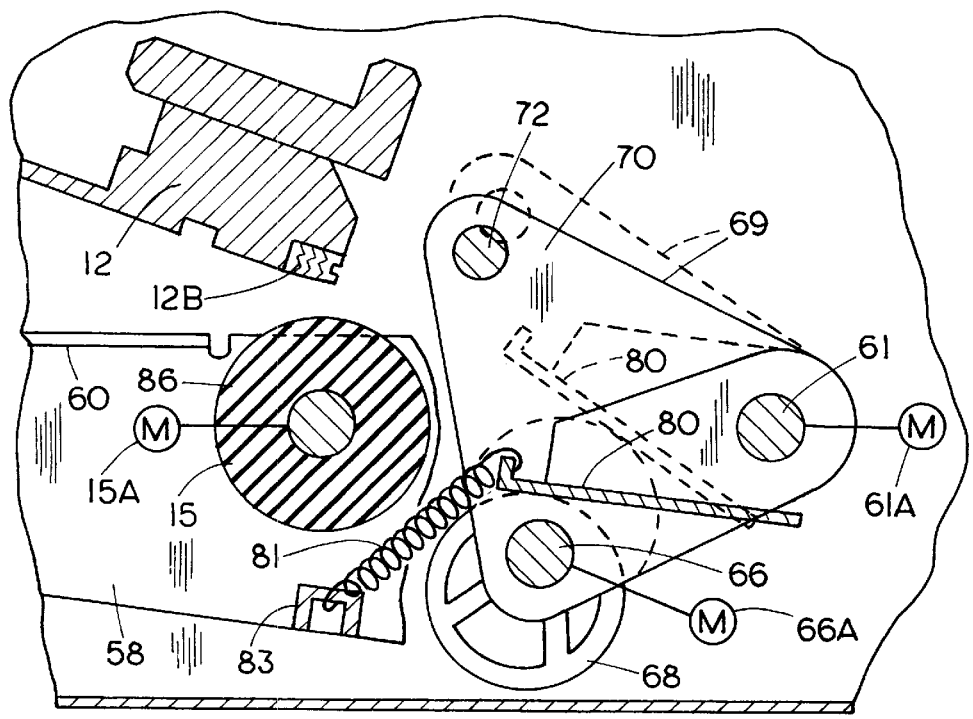
FIG. 17 is an enlarged view of a printing shaft support and a cam follower plate with parts of a side wall of a platen frame broken away.

Upstanding ears 70 are part of plates 69 which are independent of the side arms 58, and these ears 70 hold a cross shaft 72 in position, (see FIG. 17 as well). The ends of the shaft 72 extend through slots 74 in the side walls 31 of the housing, so that there can be some movement of the shaft 72 to permit the printhead cartridge to be inserted into the housing and latched in place. Shaft 72 has bearing hubs 76 at its ends, again as shown in FIGS. 15 and 16, and the receptacles 42 are of size to receive these hubs 76 as the printhead cartridge assembly 36 is inserted into place. The receptacles 42 are formed with a guide edge or a lead-in edge 42A that will slip under the hubs 76 and lift the shaft 72 so that the hubs 76 on the shaft 72 can slip into the receptacles 42, and detent in place in recesses 42B. When the print cartridge is moved into this position, it carries pins on the sides that protrude to slide into open-ended slots 78 (see FIG. 6 for example) so that the printhead cartridge 36 is held from unwanted movement relative to the housing.

Cam rollers 68 act against a pivoting cam follower plate 80 which has side arms 82 on opposite sides of the housing 30 pivoted on shaft 61 as well (see FIG. 17). The cam rollers 68 will change the position of plate 80. Springs 81 carried on the edge of plate 80 are used to apply a load to the platen through a cross member 83 that mounts on walls 58 and on which end of springs 81 are hooked. The platen roller 15 can be driven by stepper motor 15A, the carrier 17 and the disc 14 are also driven through the printing cycle, and under the printhead 12, and force from the springs 81 urging the platen roller 15 upwardly changes, depending on the cam roller 68 position. The platen 15 has an outer resilient covering 86 as shown.

By changing the pressure exerted by the platen roller 15 upwardly against the carrier 17, and thus against the disc 14, compensation for the changing in lengths of print line as the circular disc is fed under the printhead 12 will be made. When the print line is longer, the force from springs 81 is greater due to the cam roller position.

Figures 6A, 6B:
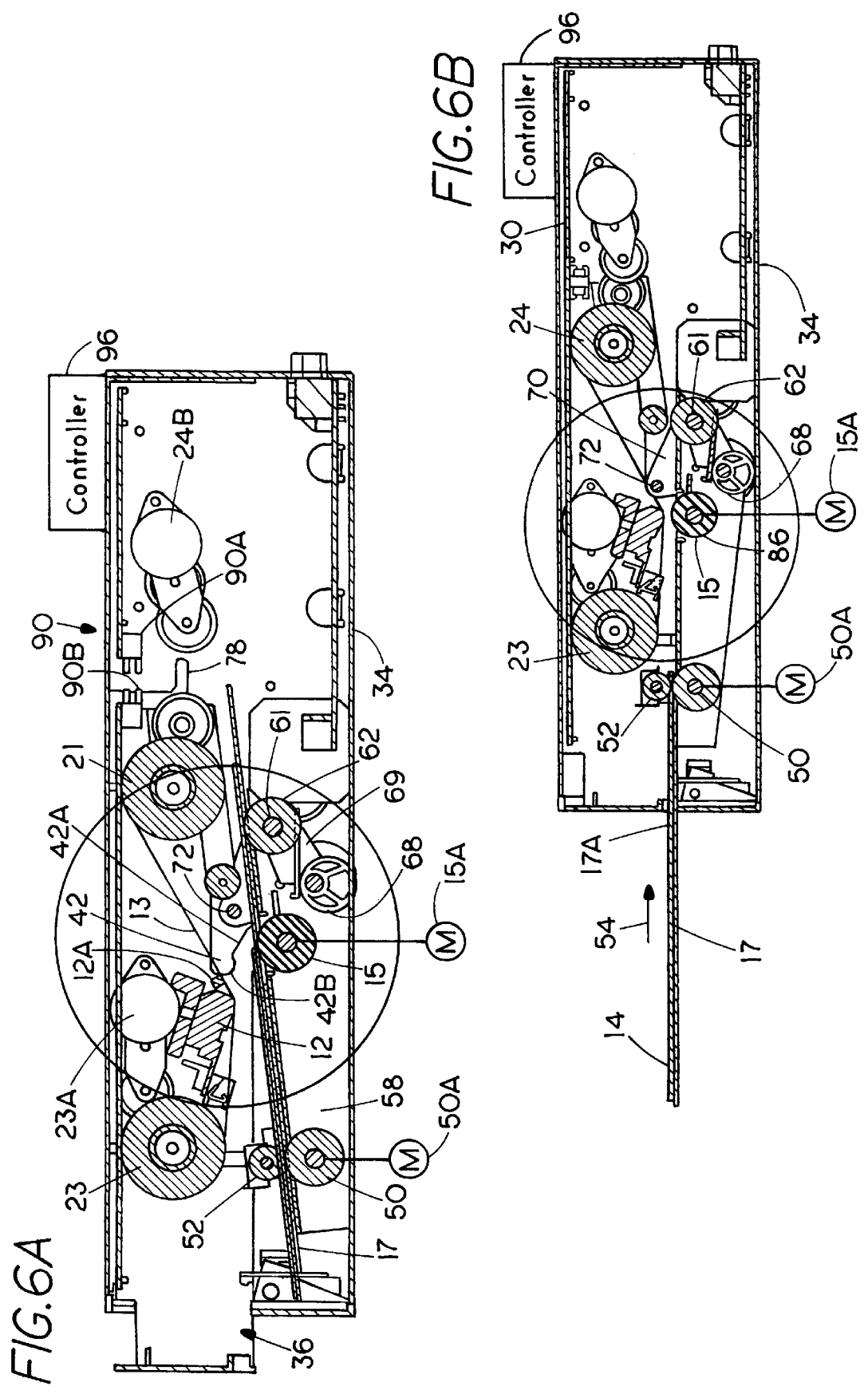

Positioning the cartridge assembly 36 for sliding into the housing 30 is illustrated schematically in FIG. 6, where it is disengaged, and the cartridge assembly 36 is entering the provided opening in the front of the housing 30 for insertion. It can be seen in FIGS. 6A and 6B, that the side members 40 of the cartridge assembly 36 are approaching the shaft 72 that has the hubs 76 (FIG. 15) for retaining the cartridge when it latches in place. In the view in FIGS. 6A and 7A, it can be seen that the receptacles 42 and guide edge 42A on each side are approaching the shaft 72. This is also shown enlarged in FIG. 7A. The print ribbon 13 from the supply roller 23 and take-up roller 24 will be threaded under the printhead 12, and then the printhead cartridge 36 will be slid into place as shown in FIG. 6B held by the shaft receptacles 42, and the slots 78 at one end.

In FIG. 6B, the substrate carrier 17 is shown in its loading position, having been driven there by the drive rollers 50 and pinch roller 52 outwardly under control of a controller 96. The disc 14 can be put into the carrier and located against edge 19. This is also shown in FIG. 14.

The drive rollers 50 can then be driven from a suitable stepper motor 50A under control of central controller 96 to move the carrier and substrate or disc in the direction indicated by the arrow 54 and so that the leading end 14A of the disc 14, where the transverse width is not very large (this is a chord of the circular disc) moves under the printhead.

While, for simplicity, this description has shown individual stepper motors for platen roller 15 and rollers 50 and 62, these rollers can be driven together with gears (or timing belts) using only one stepper motor, such as motor 61A.

Figure 10:
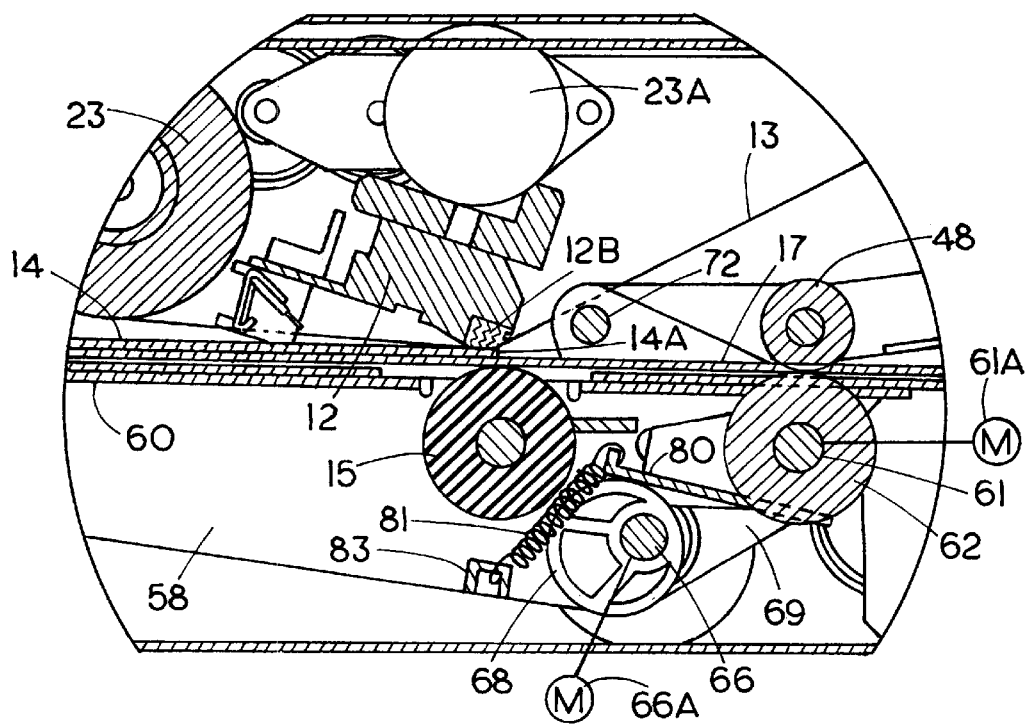
FIG. 10 is an enlarged sectional view of the portion shown in FIG. 9 with printing about to commence.

The start of the printing cycle is shown in FIG. 10, where the leading end 14A of substrate or disc 14 is immediately under the printhead 12, which has the resistors forming heating elements 12B to provide print heat. The platen roller 15 is urged up by the cam rollers 68 acting through the plate 80 and springs 81 to provide a low force to pivot platen support frame 56 and the platen roller 15 up against the support or carrier 17. Thus a low force urges the end of the disc or substrate 14 against the end of the printhead 12.

Figure 11:
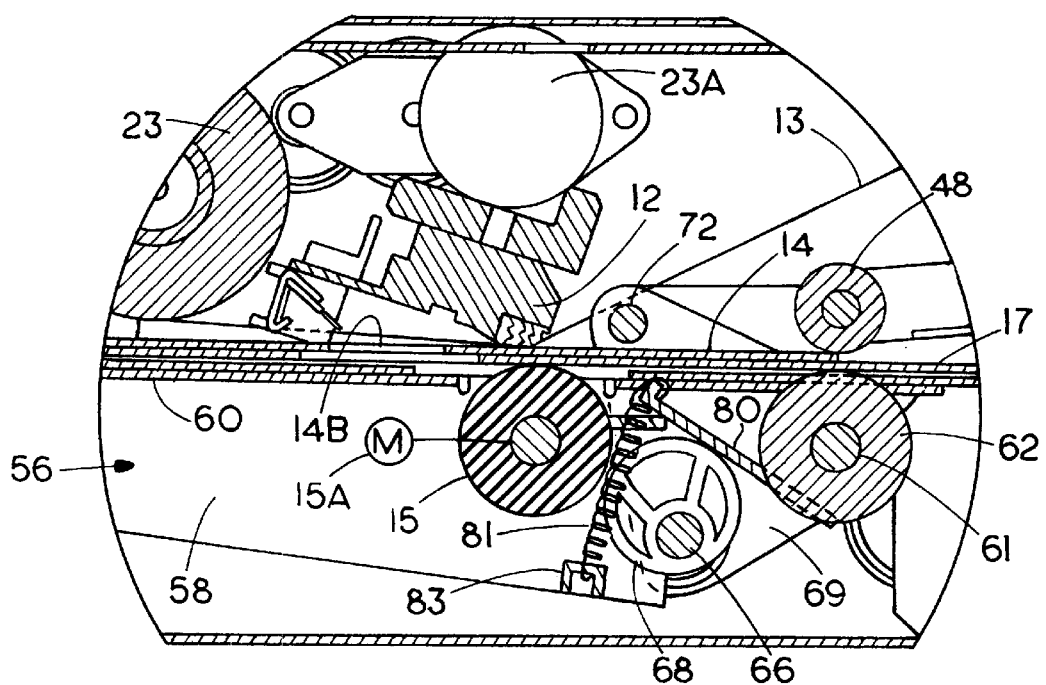
FIG. 11 is a sectional view similar to that shown in FIG. 10, with the printing about a third of the way through, where a maximum chordal length of the print area on the circular substrate is encountered near the center opening of a CD.

FIG. 11 illustrates the positioning of the disc 14 when it has been fed approximately ⅓ of the way through by the drive rollers 50 and 52 and by drive roller 62. The pinch roller 48 is in position over the drive roller 62. The cam rollers 68 have been moved to a position where they have moved cam follower plate 80 to its maximum actuated position for exerting a maximum force on the platen roller 15 through springs 81 because the center portions of the disc or substrate 14 are under the printhead 12 and a long print line is needed.

Figure 12:
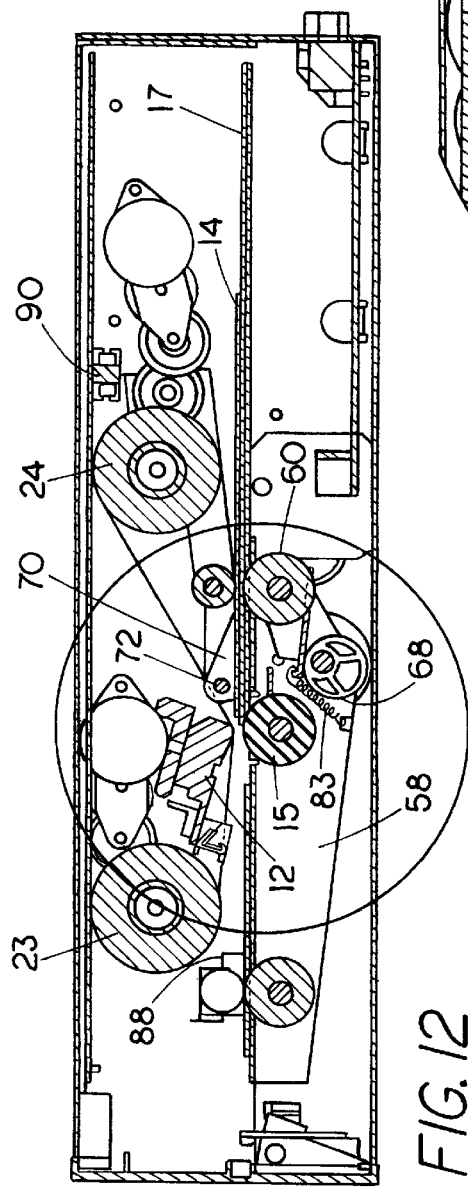
FIG. 12 is a sectional view similar to FIG. 8, when the platen frame is lowered, after printing is done to allow the print ribbon to advance and the substrate and carrier to be moved back for another pass.

It should be noted that the substrate 14, when it comprises a CD, CD-R or DVD, has a hole 14B in the center portions (FIG. 9) so that the force required as the printhead starts printing on opposites sides of this hole is lower. The maximum force on platen roller 15 is approximately at the ⅓ of the way through the printing cycle as shown in FIGS. 11 and 12. The printhead is held in position by slots 78 and because shaft 72 which seats in receptacles 42 and the cam shaft 66 are both mounted on plates 69 as can be seen in FIG. 17.

As the substrate or disc moves farther, the cam rollers 68 reduce the force on platen roller 15 as the printhead passes over the hole 14B in the disc and goes back to maximum when the region following the trailing side of the hole is printed, and then the platen force reduces as the disc moves further.

Figure 13:
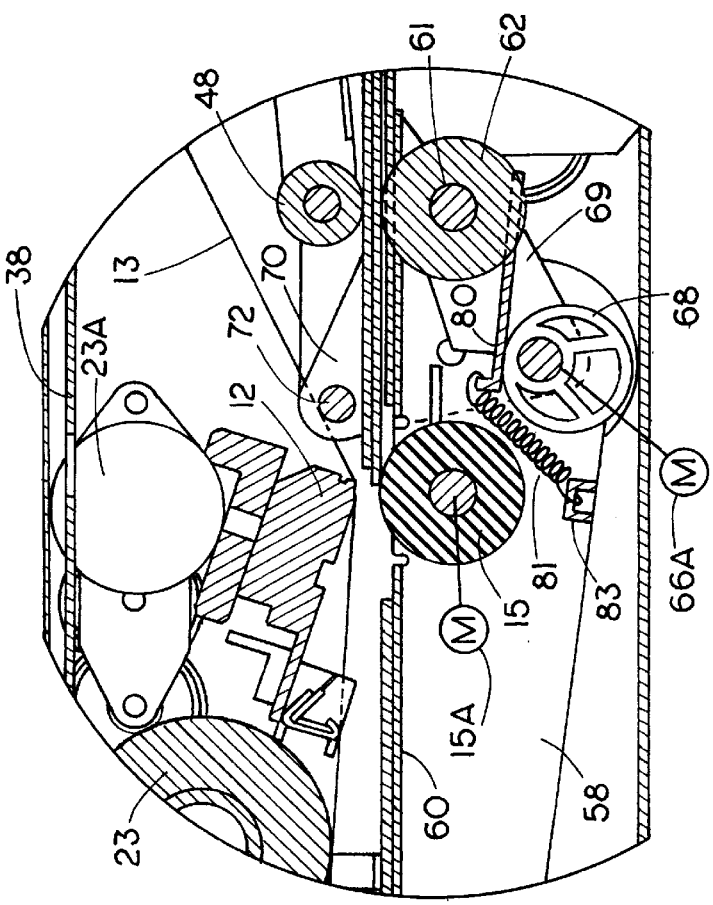
FIG. 13 is an enlarged sectional view of the circled portion in FIG. 12.

In FIGS. 12 and 13, the substrate has been moved from under the printhead 12, and the print ribbon 13 is being advanced. The platen roller 15 is permitted to move away from the printhead 12, to permit the ribbon, film or web 13 to be advanced so that the next color can be printed. If multi colors are to be printed, the carriage or carrier 17 and the disc 14 would be reversed in direction and another layer printed over the same region. The disc is indexed appropriately using suitable sensors such as the sensor shown at 88 in FIG. 12. The signal from the sensor will be used to coordinate the position of the disc 14 with the ribbon, film or web 13 and a particular color panel that is on that film.

In this way, the force that is exerted by the platen against the carrier 17 and thus against the disc 14 can be changed to be suitable for changing lengths of printing that is being carried out by the printhead as the disc again passes beneath it.

The disc 14, when printing is done, is removed after the carrier 17 is backed out and the printed disc 14 removed. A new disc is put into the carrier 17 and the printing is repeated anew.

It also can be seen in FIGS. 6A and 12 that electrical connections for the motors on the printhead cartridge assembly can be made with the connector shown at 90, which includes a portion 90A on the housing 30, and a second portion 90B on the printhead cartridge 36. When the printhead cartridge 36 moves to its home position, as latched with the receptacle 42, connection will be made for the power.

The controller shown at 96 will coordinate all functions, including the movement of the cam shaft 66 and the platen roller 15, through the stepper motors 66A and 15A, and the position of cam shaft 66 can be changed so that the cam rollers 68 will vary the force on the platen as needed. The printing can be preprogrammed into the controller.

Although the present invention has been described with reference to preferred embodiments, workers skilled in the art will recognize that changes may be made in form and detail without departing from the spirit and scope of the invention.

What is claimed is:

1. A printer for printing onto a circular object comprising a housing, a printhead mounted in said housing and secured in a reference position, a support for a circular object, a drive for said support to move said support and a circular object thereon in a plane relative to said printhead, and a platen for engaging the support and moving the support and the circular object toward the printhead to provide a printing pressure that is changeable as a function of the position of the circular object as the support moves relative to the printhead.

2. The printer of claim 1, wherein the printhead is a thermal dye sublimation printhead having a plurality of heat elements for engaging a ribbon to transfer printing onto the circular object.

3. The printer of claim 1, wherein said circular object is made of a plastic material.

4. The printer of claim 1, wherein said circular object is selected from one of a compact disc, a recordable compact disc and a digital video disc.

5. The printer of claim 1, wherein said platen is mounted on a pivoting frame relative to said housing, and a position control synchronized with movement of said support and changing the force the platen exerts against the support.

6. The printer of claim 5, wherein said position control comprises a cam rotatable relative to the printhead that controls a variable force on the printhead.

7. The printer of claim 1, wherein said printhead is mounted onto a separate cartridge, said cartridge being slidably removable from said housing.

8. The printer of claim 7 including a latch for holding the cartridge in position on the housing.

9. The printer of claim 7, wherein said printhead engages a ribbon carrying dye sublimation materials, said ribbon being provided on a supply roll, a take-up roll for receiving ribbon which has been used for printing, the supply and take-up rolls being mounted on said cartridge, such that the printhead and supply and take-up rolls are removable from said housing for loading said ribbon.

10. The printer of claim 9, wherein said cartridge has a lower side, the printhead having a printing portion open to the lower side, and supports for said supply and take-up rolls accessible from the lower side for loading said ribbon across the printhead when the cartridge is removed from the housing.

11. The printer of claim 10, wherein said housing has a first electrical connector mounted thereon, a mating electrical connector mounted on said cartridge, and said first electrical connector on the housing and said mating electrical connector engaging and making electrical contact when the cartridge is latched in the housing.

12. The printer of claim 6, wherein said cam has a position that permits the platen and support to be lowered and spaced from the printhead, and a motor drive for moving a print ribbon relative to the printhead when the platen is moved to a position to place the support spaced from the printhead.

13. A thermal transfer printer for printing on circular objects comprising a housing, a cartridge removably mounted in said housing and securable in a working position, a printhead mounted on said cartridge, a ribbon supply mounted on said cartridge for providing a ribbon relative to a portion of the printhead, and exposed at one surface of the cartridge, a platen mounted in said housing, a movable generally planar carrier for supporting a circular object to be printed and movable between a loading position and a printing position, and an actuator for moving the platen against a surface of said carrier opposite from the printhead to urge the carrier, and a circular object supported thereon against the ribbon and printhead.

14. The printer of claim 13, wherein said actuator comprises a cam actuator rotatable about an axis generally parallel to an axis of the platen, said cam actuator including cam rollers that engage a pivoting plate, at least one spring coupled to the platen and to the pivoting plate for changing force on the platen tending to move the platen toward the carrier relative to a position of the carrier.

15. The printer of claim 13, wherein said actuator is movable to a position to space the platen carrier and a circular object carried thereby from the printhead.

16. The printer of claim 15 including the drive for a ribbon to move the ribbon when the platen is moved to the position spaced from the printhead.

17. The printer of claim 15, wherein said platen is mounted on a pivoting frame, and said actuator is mounted on said housing, a spring connecting said pivoting frame and the actuator to move the platen toward the printhead under a spring force.

18. The printer of claim 17, wherein said actuator is a rotatable cam member, and a drive of said rotatable cam member being synchronized with the position of the movable carrier such that the spring exerts lesser force when the movable carrier is in a first position with a leading edge of a circular object thereon under the printhead, and a greater force as longer print length portions of said circular object move under the printhead.

19. The printer of claim 13, and a latch for said cartridge comprising a rod, said cartridge having spaced apart side walls, and leading edges of said side walls of the cartridge having notches for receiving said rod when the cartridge is in a working position relative to the housing.

20. The printer of claim 19, wherein said rod is mounted on a pivoting support, and said notches have detent portions for retaining the cartridge in a secured position, said cartridge being fixed in a position relative to the housing and platen when in its working position.

21. A printer comprising a printhead, a platen, and a carrier for supporting an object to be printed positioned between the platen and the printhead, a drive for driving the carrier between a loading position and a printing position, and to move the object to be printed relative to the printhead, the carrier, the platen, and the drive for the carrier being mounted in a first housing, and the printhead being mounted in a second removable housing that is latchably positionable relative to the first housing and is accessible from an exterior of the first housing and is removable from the first housing independently of the carrier.

22. The printer of claim 21. and an actuator for moving the platen in a direction toward and away from the printhead when the carrier is in the printing position, said actuator varying the force of urging the platen against the carrier as a function of the position of the carrier and the object to be printed held thereon relative to the printhead.

23. The printer of claim 22, wherein said actuator comprises a rotatable cam, said platen being rotatable relative to the movement of the carrier, and the rotation of the cam and the rotation of the platen being synchronized.

24. The printer of claim 21, wherein said second housing has supports thereon for mounting a ribbon to be used with the printhead.

25. The printer of claim 21, wherein said circular object is selected from one of a compact disc and a compact recordable disc made of a polycarbonate material.

26. The printer of claim 21, wherein said printhead is a thermal dye sublimation printhead.

* * * * *